(No Model.)
W. E. TALLCOT.
FRICTION CLUTCH.
No. 389,339. Patented Sept. 11, 1888.
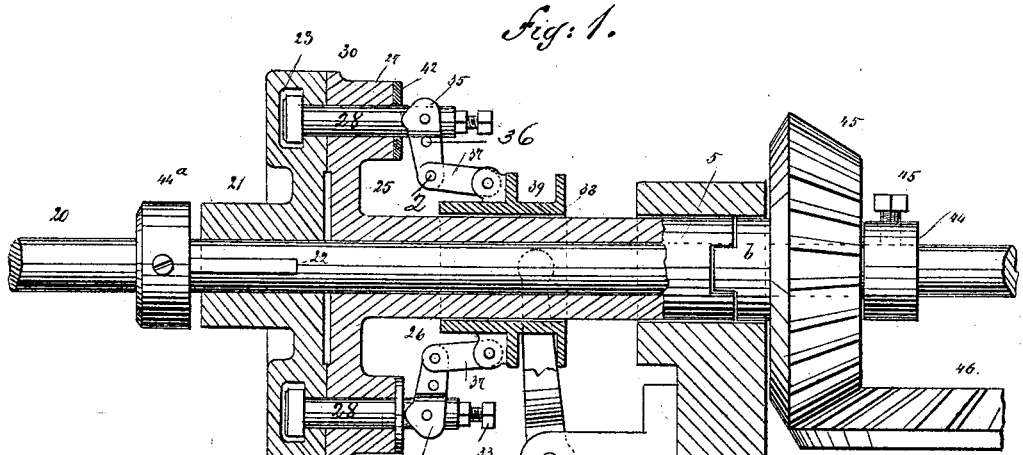
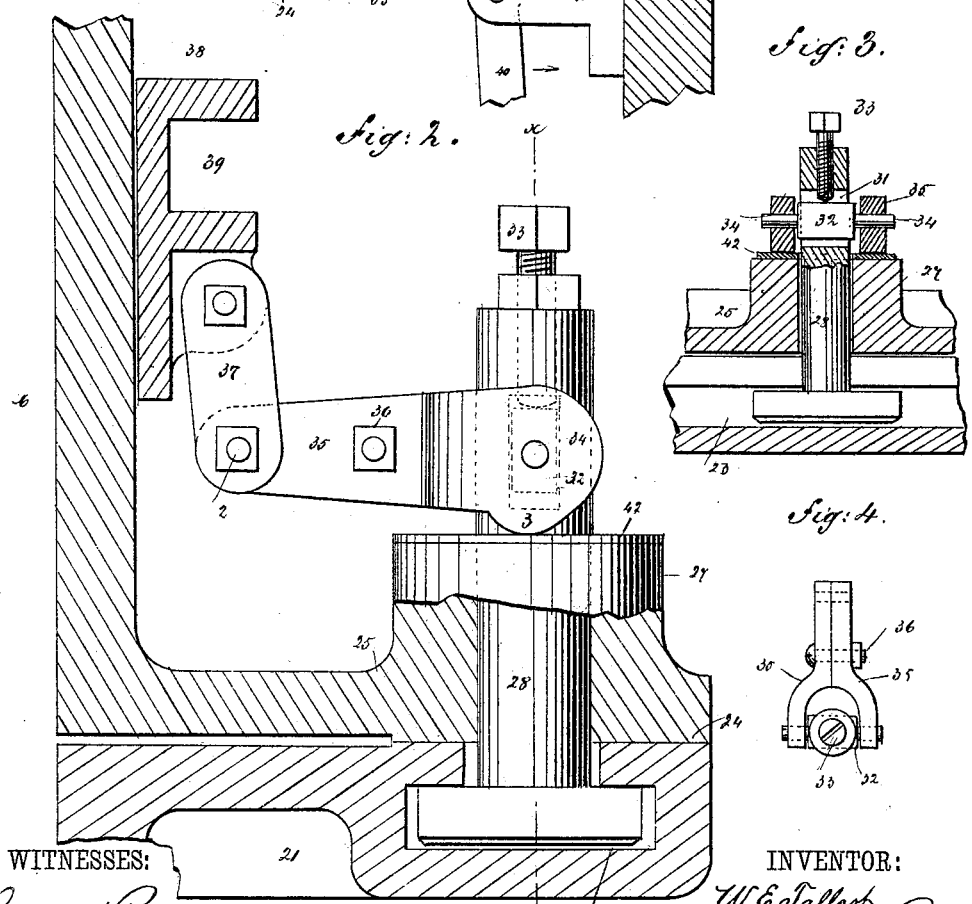
WITNESSES:
Chas. Niora
C. Sedgwick
INVENTOR:
W. E. Tallcot
BY Munn & Co.
ATTORNEYS.

United States Patent Office.

WILLIAM E. TALLCOT, OF CROTON LANDING, NEW YORK.

FRICTION-CLUTCH.

SPECIFICATION forming part of Letters Patent No. 389,339, dated September 11, 1888.

Application filed November 21, 1887. Serial No. 255,757. (No model.)

*To all whom it may concern:*

Be it known that I, WILLIAM E. TALLCOT, of Croton Landing, in the county of Westchester and State of New York, have invented a new and Improved Friction-Clutch, of which the following is a full, clear, and exact description.

This invention relates to clutches, the main object of the invention being to provide a clutch which may be quickly and readily manipulated, and one which is especially adapted for use in connection with brick-making machines.

Reference is to be had to the accompanying drawings, forming a part of this specification, in which similar figures of reference indicate corresponding parts in all the views.

Figure 1 is a central longitudinal sectional view of my improved form of clutch. Fig. 2 is an enlarged detail view of a portion of the clutch, parts being shown in section. Fig. 3 is a detail sectional view on the line $x$ $x$ of Fig. 2; and Fig. 4 is an end view of one of the clamping-bolts, set-screw, and arm-sections 35.

In the drawings above referred to, 20 represents a driving-shaft, upon which there is mounted a friction-clutch, 30, of which the section 21 rides upon a feather, 22, that is formed upon the shaft 20. This section 21 is formed with an undercut groove, 23, and with a flat bearing-face, 24. The other section of the clutch is shown at 25 and consists of a disk that is made integral with a sleeve, 26, which rests loosely about the shaft 20. The section 25 is formed with two or more bosses or projections, 27, that are centrally apertured to receive the shanks of the clutch-clamping bolts 28, the heads of these bolts 28 riding in the undercut groove 23 of the clutch-section 21. The extending ends of the bolts 28 are formed with slots 31, in which there are placed trunnioned blocks 32, said blocks being adjustable toward the head of the bolt by means of set-screws 33, which engage with threaded apertures that are formed in the extreme ends of the bolts 28.

To the trunnions 34 of the blocks 32, I connect arm-sections 35, which sections are united by a bolt, 36, and the ends of each pair of these arm-sections are apertured, in order that they may be engaged by a bolt, 2, which passes through the arms of a link, 37, the opposite ends of which links are pivotally connected to a sleeve, 38, said sleeve being mounted upon the sleeve 26, and being formed with a groove, 39, that is entered by the bifurcated end of an operating lever, 40, said lever being pivotally connected to a bracket, 41, that is secured to any proper support.

The arm-sections 35 are formed with cam-bearing faces 3, and between said cams and the faces of the projections 27, I place wear-plates 42, the arrangement being such that if the lever 40 be thrown in the direction of the arrow shown in connection therewith the two clutch-sections will be firmly clamped together, for such movement of the lever 40 will force the cams 3 to bear hard against the wear-plates 42 and the bearing-faces of the two clutch-sections will be firmly clamped together, imparting motion to the operating-shaft.

The clutch above described may be applied in any manner desired. In the drawings I have shown the sleeve 26 as being formed with a clutch-section, 5, which engages with another clutch-section, 6, that is formed upon a bevel-pinion, 43, said pinion being held in engagement with the sleeve 26 by means of a collar, 44, that is held to the shaft 20 in advance of the pinion by a set-screw, 45, a second collar, 44ª, being arranged in connection with the clutch-section 21. The pinion 43 may be arranged to engage a gear, 46, that is carried upon a vertical shaft, the shaft, however, not being shown in the drawings.

Having thus fully described my invention, I claim as new and desire to secure by Letters Patent—

1. The combination, with a driving-shaft, of a clutch-section formed with a bearing-face and an undercut groove and mounted to slide upon but to turn with the driving-shaft, a second clutch-section loosely mounted on the shaft, clamping-bolts the heads of which ride in the undercut groove of the first-named section and the shanks of which extend through the second-named clutch-section, and a means, substantially as described, for clamping the clutch-sections together, as and for the purpose stated.

2. The combination, with a driving-shaft, of a clutch-section formed with a bearing-face and an undercut groove and mounted to slide upon but to turn with the driving-shaft, a second clutch-section loosely mounted upon the shaft, clamping-bolts the heads of which ride in the undercut groove of the first-named clutch-section and the shanks of which extend through the second clutch-section, eccentric-faced arms that are connected to the bolts and arranged to bear against the second clutch-section, and a means for tilting the arms, substantially as described.

3. The combination, with a driving-shaft, of a clutch-section, 21, formed with an undercut groove, 23, and mounted to slide on a feather, 22, a clutch-section, 25, formed upon a sleeve, 26, bolts 28, arm-sections 35, connected to the bolts and having eccentric faces 3, a sliding collar or sleeve, 38, links 37, connecting the arm-sections and the collar or sleeve, and an operating-lever, substantially as described.

4. The combination, with a driving-shaft, of a clutch-section, 21, formed with an undercut groove, 23, and mounted to slide on a feather, 22, a clutch-section, 25, formed upon a sleeve, 26, bosses or projections 27, bolts 28, the heads of which ride in the undercut groove 23 and the shanks of which extend out through the bosses or projections 27, arm-sections 35, connected to the bolts and having cam-faces 3, a sliding collar or sleeve, 38, links 37, connecting the arm-sections and the collar or sleeve, and an operating-lever, substantially as described.

5. The combination, with a driving shaft, of a clutch-section, 21, formed with an undercut groove, 23, and mounted to slide on a feather, 22, a clutch-section, 25, formed upon a sleeve, 26, bolts 28, the heads of which ride in the undercut groove 23, arm-sections 35, formed with cam faces 3, trunnioned blocks 32, to which the arm-sections are connected, the blocks being mounted in recesses formed in the bolt-shanks, adjusting-screws 33, a sliding collar or sleeve, 38, links 37, connecting the arm sections and the collar or sleeve, and an operating-lever, substantially as described.

6. The combination, with a driving-shaft, of a clutch-section, 21, formed with an undercut groove, 23, and mounted to slide on a feather, 22, a clutch-section, 25, having bosses or extensions 27 and formed upon a sleeve, 26, bolts 28, formed with apertures 31, the heads of the bolts being arranged to ride in the undercut groove 23 and the shanks to extend through the extensions 27, arm-sections 35, formed with cam-faces 3, trunnioned blocks 32, mounted in the recesses 31, adjusting-screws 33, wear-plates 42, a sleeve or collar, 38, links 37, connecting the arm-sections and the sleeve or collar, and an operating-lever, substantially as described.

7. The combination, with an operating-shaft, of a driving-shaft, a gear carried by the operating-shaft, a pinion carried by the driving-shaft, collars 44 and 44$^a$, fixed to the driving-shaft, a clutch-section, 21, formed with an undercut groove, 23, and mounted to slide on a feather, 22, a clutch-section, 25, formed upon a sleeve, 26, bolts 28, arm-sections 35, connected to the bolts and provided with cam-faces 3, a sliding collar or sleeve, 38, links 37, connecting the arm-sections and the collar or sleeve, the clutches 5 and 6, and an operating-lever, substantially as described.

WILLIAM E. TALLCOT.

Witnesses:
EDWARD KENT, Jr.,
C. SEDGWICK.